S. SMITH.
Bench-Hook.

No. 204,853.   Patented June 11, 1878.

Witnesses:
J. H. Shumway
H. A. Kitson

Seymour Smith
Inventor
By Atty.

UNITED STATES PATENT OFFICE.

SEYMOUR SMITH, OF WATERTOWN, CONNECTICUT, ASSIGNOR TO SMITH & SON, OF SAME PLACE.

IMPROVEMENT IN BENCH-HOOKS.

Specification forming part of Letters Patent No. 204,853, dated June 11, 1878; application filed October 26, 1877.

*To all whom it may concern:*

Be it known that I, SEYMOUR SMITH, of Watertown, in the county of Litchfield and State of Connecticut, have invented a new Improvement in Bench-Hooks; and I do hereby declare the following, when taken in connection with the accompanying drawings and the letters of reference marked thereon, to be a full, clear, and exact description of the same, and which said drawings constitute part of this specification, and represent, in—

Figure 1:
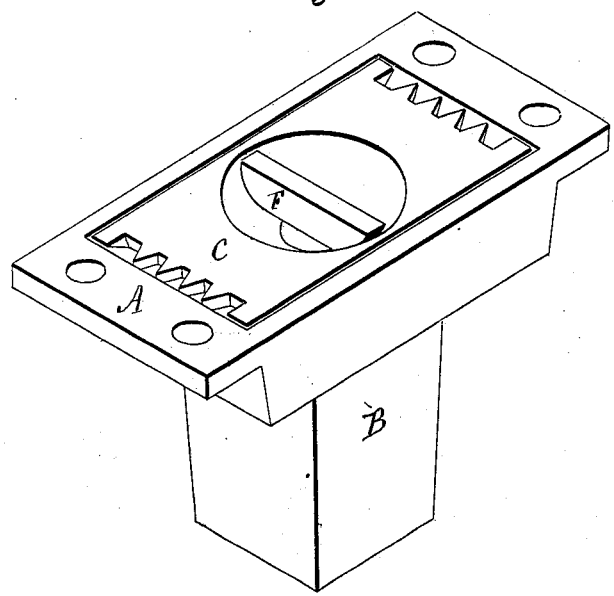
Figure 2:
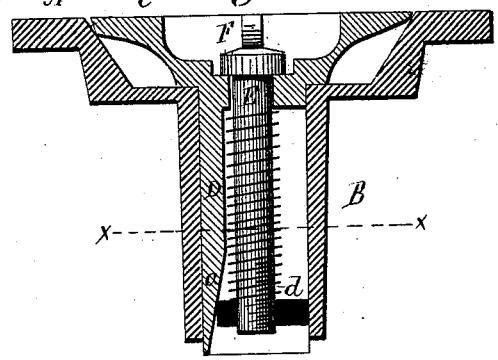

Figure 1, perspective view; Fig. 2, vertical central section; and Fig. 3, transverse section.

This invention relates to an improvement in the article commonly called "bench-hook"— that is to say, the device used by joiners and others as a fixture in their benches against which material to be worked is held, the object being a simple and easy adjustment of the hook to different elevations; and the invention consists in an outer shell the head of which is recessed, combined with the hook constructed with a hollow shank to move freely up and down in said shell, and a vertical screw-spindle in said shank, with a head for turning the same in a cavity in the top of the hook, with the nut movable up and down by turning the said screw, one surface on the interior of the said shank inclined, so that the upward movement of the said nut working against the said incline will be forced against the opposite inner surface of the said shell, and thereby bind the shank and the shell together, so as to support the hook at any point where such movement of the nut is made.

Figure 3:
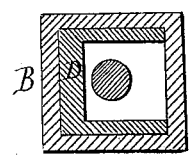

A is the head, constructed with the shell B, fitted into the bench in like manner for similarly-constructed hooks, the upper surface of the head recessed to receive the hook C, also in the usual manner. The hook C is constructed with a shank, D, hollow or U-shaped, as seen in Fig. 3, which fits the interior of the shell or socket B, but so as to move freely up and down therein. On the inside of the shank D, opposite the open side, an incline, *a*, is formed.

Through the hook is a screw-spindle, E, with a head, F, in a cavity in the top of the hook, by which to turn the said screw-spindle. On this spindle is a nut, *d*, of greater extent than the distance from the exposed side of the socket to the opposite side of the shank at its narrowest part. Hence, if the screw be turned to draw the nut upward, it will strike the incline *a*, and thereby be forced against the opposite side of the socket, and consequently produce friction between the shank and socket sufficient to prevent vertical movement of the hook; but by turning the screw backward the nut will be forced downward, so as to be free from the incline of the shank and opposite surface of the socket, and in that condition the hook may be raised or lowered, at pleasure, and reset by simply turning the screw to draw up the nut.

I do not wish to be understood as broadly claiming a bench-hook having combined with it a vertical spindle screw-threaded, and with a nut thereon to engage the hook with the shell, and as a means of adjusting or setting the hook, as such, I am aware, is well known.

I am also aware of the patent of C. E. Smith, No. 165,262, and claim nothing therein contained.

What I claim as my invention is—

The combination of the socket B, the hook C, with its open shank D, incline *a* on the inner surface of said shank, vertical screw-spindle E, and nut *d*, working between the said incline and opposite surface of the socket, substantially as and for the purpose described.

SEYMOUR SMITH.

Witnesses:
GEO. F. HUNGERFORD,
J. H. BAIRD.